United States Patent [19]

Phelps

[11] Patent Number: 4,934,663

[45] Date of Patent: Jun. 19, 1990

[54] COOLING TOWER WITH SLOPING HIGH DENSITY FILM FILL SANDWICHED BETWEEN LOW DENSITY FILM FILL

[76] Inventor: Peter M. Phelps, 15 Buckeye Way, Kentfield, Calif. 94904

[21] Appl. No.: 410,364

[22] Filed: Sep. 20, 1989

[51] Int. Cl.⁵ .............................................. B01F 3/04
[52] U.S. Cl. .......................... 261/112.2; 261/DIG. 11
[58] Field of Search ...................... 261/112.2, DIG. 11

[56] References Cited

U.S. PATENT DOCUMENTS

| | | | |
|---|---|---|---|
| 3,450,393 | 6/1969 | Munters | 261/112.2 |
| 3,707,277 | 12/1972 | Phelps | 261/DIG. 11 |
| 3,758,088 | 9/1973 | Fordyce | 261/DIG. 11 |
| 3,917,764 | 11/1975 | Phelps | 261/DIG. 11 |
| 4,317,785 | 3/1982 | Dickey, Jr. et al. | 261/DIG. 11 |
| 4,460,521 | 7/1984 | Stackhouse | 261/DIG. 11 |
| 4,592,877 | 6/1986 | Phelps | 261/DIG. 11 |
| 4,826,636 | 5/1959 | Kinney, Jr. et al. | 261/112.2 |

Primary Examiner—Tim Miles
Attorney, Agent, or Firm—Flehr, Hohbach, Test, Albritton & Herbert

[57] ABSTRACT

A cooling tower with a high density sloping film fill section and low density upper and lower film fill sections on opposite sides of and in contact with it. All sections include vertical corrugated sheets in composite forming an integral unit with adjacent sheets contacting each other and defining passages for gas and liquid.

18 Claims, 3 Drawing Sheets

COOLING TOWER WITH SLOPING HIGH DENSITY FILM FILL SANDWICHED BETWEEN LOW DENSITY FILM FILL

BACKGROUND OF THE INVENTION

Conventional cooling towers of the counterflow type employ a generally horizontal fill with an air opening below the lower surface of the same. Counterflow fills of the film type have a relatively good heat transfer coefficient. The air is drawn from below the fill and out the tower by a fan, or the draft from a high stack, positioned above the fill. When the distance between the fill and base of the tower is relatively small, the air must be drawn from the surrounding into the tower at a relatively high velocity and, when it reaches a position below the fill, it is forced to turn abruptly at a sharp angle to proceed upwardly through the fill. This requires high fan power requirements. On the other hand, by building the tower of relatively high supporting columns, the velocity of the incoming air is somewhat reduced but the overall height of the tower is substantially increased. Among the disadvantages of such height increases are increased pumping head, structural wind loads, and general appearance.

Conventional crossflow towers comprise a relatively thin vertical fill section with the water being fed from an overhead source and the air being drawn therethrough from air inlets at the side of the tower. Since there is no necessity for the air to make radical changes of direction in the fill and the air inlet is spaced along the entire height of the fill, the overall air pressure losses are usually less than those of a conventional counterflow tower as set forth above.

A crossflow cooling tower is inherently less efficient with respect to heat transfer than a counterflow tower based on a unit of fill. Another disadvantage of the crossflow cooling tower is that the water is loaded onto the top of the relatively thin crossflow fill. There is a maximum water load beyond which the water will not redistribute effectively because it will start gushing in a steady stream through the tower. When this maximum water load is exceeded in a crossflow tower of the film fill type, the water will not cling to the fill, leading to relatively poor heat transfer between the air and water. Also, resistance to the transversely flowing air is substantially increased requiring excessive fan power. This problem of water loading cannot be effectively overcome by widening the fill in the direction of air flow because there is a limiting factor on cooling efficiency relative to the thickness of the fill. A major factor in this limit is that the fan power for the longer air path through the fill disproportionately increases in comparison to the advantages to be attained by easing the above water load problems.

Corrugated film type fill is relatively efficient in either a counterflow or crossflow cooling tower. When utilized in conventional (horizontal) counterflow type tower, variations in the direction of the corrugations will affect the ease or difficulty of gas and liquid passage in a similar manner. For example, by disposing the corrugations at a relatively vertical inclination, the gas path is eased for lower power requirements but so is the liquid path leading to relatively poor film formation and low liquid residence time. On the other hand, by disposing the corrugations at a relatively horizontal inclination, the gas must travel through a tortuous path which greatly increases the fan power requirements.

U.S. Pat. No. 3,917,764 discloses a liquid-gas cooling tower which combines advantages of the counterflow and crossflow cooling towers. Specifically, that patent describes a cooling tower with a film fill section having an incline principal plane formed of a number of sheets mounted for the passage of gas and liquid. This sloping film fill section spreads the liquid gravitating onto its upper surface into a thinner, more uniform film on the lower surface. Splash-type fill is disposed inboard and/or outboard of the sloping fill. Corrugated and other types of film fill are disclosed. While this tower provides good contact characteristics, it is relatively expensive to install the splash fill. In the sentence bridging columns 9 and 10 of that patent, there is a suggestion of using widely spaced film fill functioning in the manner of splash fill in combination with the sloped film fill. One use of widely spaced film fill in a splash fill mode is disclosed in U.S. Pat. No. 3,758,088 in which members formed from corrugated boards are disposed on edge and spaced apart in a grid.

U.S. Pat. No. 3,450,393 discloses a crossflow cooling tower including a stack of two film fill sections with a thin high density fill disposed over a low density film fill section which performs the cooling. The upper fill section is used to provide an even diffusion of water falling from the distribution pan. The corrugated sheets are perpendicular to the direction of air flow through the lower section and so block the passage of air. At column 2, lines 63-69, the patent specifies that the air does not pass through the channels of this high density film.

U.S. Pat. No. 4,460,521 discloses another use of fills of different density, in this instance, all of the splash fill type in a crossflow cooling tower. In one embodiment, a sloped section of high density splash fill is flanked by triangular sections of low density splash fill.

Another combined fill application is disclosed in U.S. Pat. No. 4,317,785. That patent describes a cooling tower with a number of film fill box-like sections arranged in a stair-step configuration progressing with the highest section at the outboard end of the fill area and the lowest section at the inboard end. The remainder of the tower available for water distribution is filled with splash fill. Air travels horizontally through the film fill boxes.

U.S. Pat. No. 4,592,877 discloses a combination of crossflow and counterflow. FIG. 3 of that patent discloses two sloping film fill sections of the type described in U.S. Pat. No. 3,917,764 flanking a horizontal film fill section, all disposed above splash fill sloping generally inboard to define a partially open chamber.

SUMMARY OF THE INVENTION AND OBJECTS

It is a general object of the invention to provide a liquid-gas contact tower which uses a sloping film fill section of improved water distribution.

It is another object of the invention to provide such a cost-effective tower utilizing layers of film fill of different densities.

It is a further object of the invention to provide such a system which decreases the tendency of liquid to flow on the lower edge of the sloping film fill.

Other objects and features of the invention will be apparent from the following description taken in conjunction with the appended drawings.

In accordance with the above objects, the present invention relates to a cooling tower with a high density sloping film fill section flanked by low density upper and lower film fill sections. Each section includes sheets mounted in composite to form integral units with adjacent sheets contacting each other and defining passages for gas and liquid. The sheets in each section are (a) substantially vertical and (b) aligned to define a gas path extending from the tower gas inlet opening to its gas outlet opening. Preferably, the upper and lower film fill sections are of generally triangular configuration. A preferred film fill is formed of adjacent crossing corrugated sheets. In another aspect of the invention, an integral film fill unit is formed of the above three sections adhered to each other in a parallelogram configuration which can readily be placed in a cooling tower.

DETAILED DESCRIPTION OF THE PREFERRED EMBODIMENTS

In general, the present invention concerns the utilization of high density slope film fill flanked by low density film fill in a gas-liquid contact tower. Although useful in gas stripping towers and the like, such towers will be designated "cooling towers" herein as they are most commonly utilized for cooling liquid, such as water, by inducing the surrounding gas, air, into the tower to contact and thereby cool the water.

Figure 1:
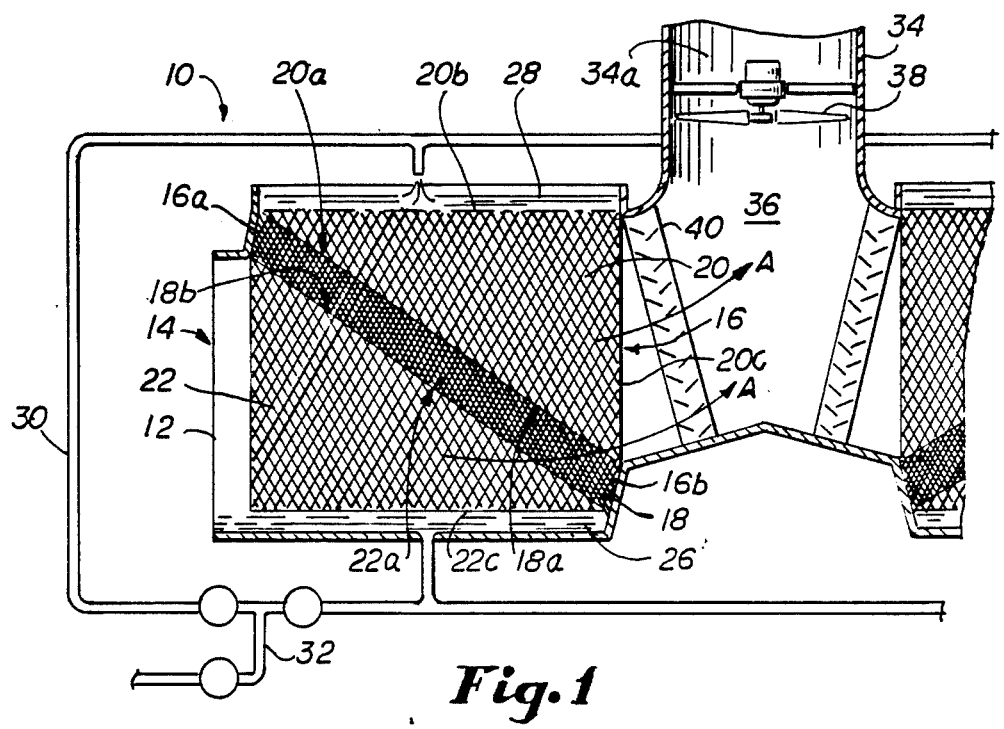
FIGS. 1-3 illustrate different embodiments of gas liquid contact towers illustrating the sloping high density film fill section flanked by low density film fill sections in a cooling tower according to the present invention.

Referring to FIG. 1, a cooling tower, broadly denoted by the number 10, is illustrated comprising two similar cooling sections disposed on opposite sides of the central plenum chamber. For simplicity of description, only the section illustrated on the left-hand portion of the drawing will be described. This section includes an upright sidewall 12 having a gas inlet opening 14 extending along the major portion of the sidewall and defined by a framing portion of the same. An integral film fill assembly 16 is formed of three components, sloping film fill section 18, and upper and lower film fill sections 20 and 22, respectively. Section 18 extends from the upper outboard corner 16a to the lower inboard corner 16b of assembly 16. In composite, assembly 16, which will be described in more detail hereinafter, is in the general configuration of a parallelogram, generally rectangular in this instance. The upright walls of the assembly can also be sloped rather than being vertical.

Section 18 is disposed with a principal plane inclined at a substantial angle to both the vertical and horizontal, 45°, in the illustrated position. The angle may be substantially varied, suitably between 20° and 70° to the vertical, depending on the type of functional characteristics required for the tower. Section 18 is generally rectangular and has an up face 18a mating with adjacent sloping lower face 20a of the upper film fill section. Correspondingly, section 18 has a lower face 18b contacting adjacent sloping upper face 22a of section 22. As illustrated, sections 20 and 22 are generally triangular. Section 20 also includes an upper wall 20b and an end wall 20c which, together with sloping wall 20a, form a triangular shape. Correspondingly, lower section 22 includes upstanding outboard wall 22b and a bottom wall 22c forming the triangular configuration.

A cool liquid basin 26 is disposed below fill assembly 16 to receive liquid gravitating therefrom. An open top perforated distribution pan or tray 28 is positioned above fill assembly 16 to permit water to gravitate through the perforations onto fill assembly 16 and more particularly onto the top wall 20b of upper film fill section 20. Suitable pumping structure, not shown, is operably coupled to basin 26 for moving liquid through line 30 and for delivering the water to equipment requiring the same for cooling and for returning the same to tray 28 through valve combination 32. If desired, a portion of the liquid removed in line 30 may be recycled to tray 28 for further cooling prior to delivery to the equipment, or liquid from equipment can bypass tray 28 directly into basin 26.

Referring again to FIG. 1, a vertical stack 34 is secured to the top face of tower 10 and extends upwardly from a central plenum chamber 36 to define an upper outlet opening 34a for gas (air) exiting therefrom. A fan 38 positioned within stack 34, coupled to a suitable source of power for actuation, causes currents of air to be drawn through fill assembly 16 generally along path A and forced upwardly through chamber 36 into stack 34 for discharge through the upper portion of the latter. Alternatively, the cooling tower may be operated by natural induction by the elimination of fan 38 in which case air would be induced to flow through the tower by means of natural convection of the warm exhaust air rising through chamber 36.

A drift eliminator wall 40 is disposed across the path of air exiting from assembly 16 in a generally upright position to prevent gravitating water from being carried as a spray into the plenum chamber. Wall 40 may be of any conventional type such as including a series of spaced inclined baffles to prevent significant quantities of liquid droplets to escape into the plenum chamber.

Figure 5:
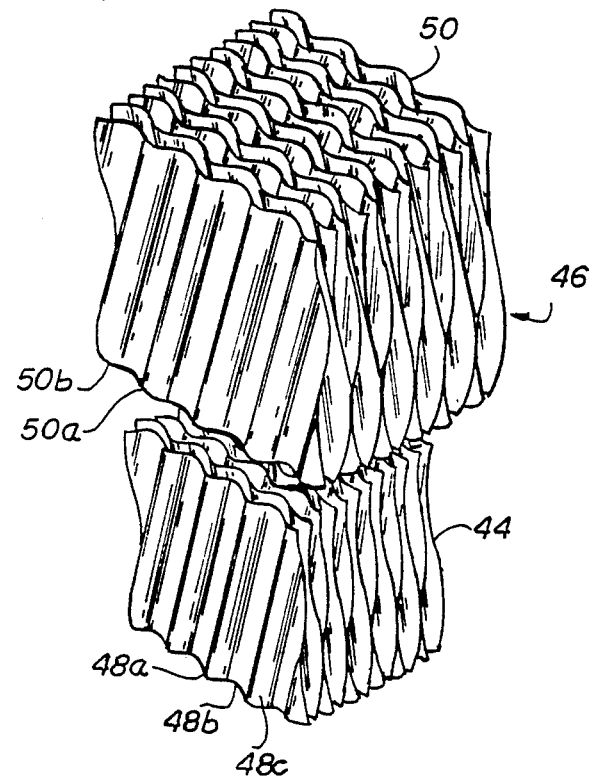
FIG. 5 illustrates the interface between high density film fill and low density film fill of the corrugated type according to the invention.

Referring to FIG. 5, corrugated film fill is illustrated with a high density fill generally designated by the number 44 below low density film fill generally designated by the number 46. (In the actual fill assembly 16, the adjacent edges of the sheets forming the high and low density fill provide open communication but contact each other.) Corrugated film fill is particularly well adapted for use in each of the film fill sections 18, 20 and 22. Section 44 includes a number of corrugated sheets 48 with ridges 48a and grooves 48b disposed so that ridges of alternate sheets cross and abut against the ridges disposed between alternate sheets to form channels between them. The channels have a constantly varying width from 0 at the contact points between the sheets to a maximum of twice the distance between the ridges and grooves of individual sheets. In the illustrated embodiment, the corrugations of the type illustrated in fill 44 extend throughout slope fill section 18 with the sheets substantially vertically disposed to provide an essentially vertical path to liquid gravitating from the liquid supply means. The sheets preferably are substantially parallel to the direction of air flow along path A without unnecessary redirection of the air to avoid consequent increased fan power requirements.

The low density film fill 46 is of the same type as high density fill 44 with the exception that the parallel corrugated sheets 50 are less densely packed. Both high density fill 44 and low density fill 46 have 0 spacing at the contact point between them where they are suitably glued together. However, the increased spacing is provided by deeper ridges and grooves 50a and 50b so that the maximum distance apart is substantially greater than that of the high density fill. To simplify the contrast in the spacing of high density fill 44 and low density fill 46, the density will be referred to in terms of the number of sheets per linear unit of cross-section. For purposes of the present invention, the high density fill includes from about 1.25 to 3.0 times the number of sheets per unit length of low density fill and preferably from about 1.5 to 2.0 times for optimum performance For example, Munters 25060 could be used as the low density fill and Munters 12060 as the high density fill.

Sheets 48 and 50 are preferably formed of a plastic material such as polyvinylchloride. The sheets are preferably adhered to each other at the points of contact by means of solvent gluing at the interfaces. In this technique, solvent is applied at the contact points to form an adhesive with the plastic. The contact points adhere on solidification. In another embodiment the sheets are not adhered. Instead, they are hung and contact each other through spacer elements integral with the sheets.

The angle that the corrugations of sheets 48 and 50 assume with respect to mounted assembly 16 may be varied substantially in accordance with transfer requirements of the particular tower. In one preferred embodiment, a major portion of the corrugations are an inclination of 0° to 45° to the horizontal. Horizontally flowing air along the path of arrow A has a relatively easy path through fill assembly 16 as it is not required to abruptly change its direction. This leads to low fan power requirements. Simultaneously, the same fill provides a relatively tortuous path for the gravitating liquid to increase the redistribution and spreading of the liquid onto the fill surface. This principle of operation of sloping fill section 18 is described in U.S. Pat. No. 3,917,764, incorporated herein by reference.

The angles between the corrugations of adjacent sheets 48 and 50 may be varied substantially. However, it is preferable that the angle be relatively small, say no greater than 30° to 60° viewed in the direction of the air path. Where the bisector of the included angle between crossed corrugations is relatively horizontal, reduction of the included angle facilitates air passage through the fill to reduce the fan power requirements.

Figure 4:
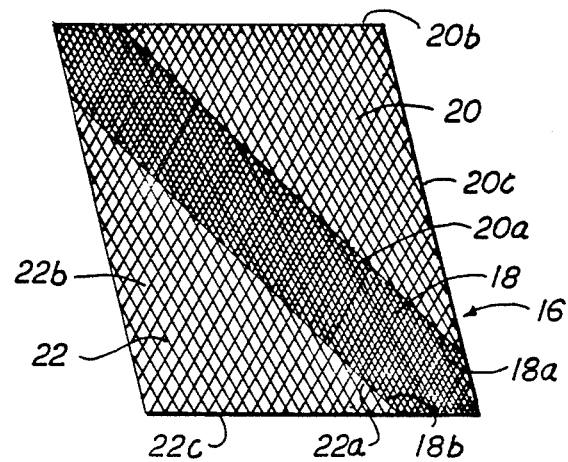
FIG. 4 schematically illustrates an integral film fill assembly according to the invention.

In a preferred embodiment, fill assembly 16 is formed into an integral self-supporting unit, of the type illustrated in FIG. 4, capable of being prefabricated and installed directly in the tower. In that regard, a suitable adhesive is formed (e.g. by solvent gluing) between the contact points of the upper and lower film fill 20 and 22, respectively, with the sloping fill section 18. Such contacts are at 18a and 20a and 18b and 22b, respectively. As illustrated in FIG. 5, the sheets of the high density and low density fills are generally aligned or parallel to each other and to the direction of the air flow along the arrow A as illustrated in FIG. 1. This minimizes fan power requirements. If desired, such alignment may be varied for specialized locations. Also, such sheets preferably are substantially vertical to provide an essentially vertical path to liquid gravitating from tray 28. Sheets at contact planes 20a and 22a should cross at these planes so as to create contact points for maximum capillary water flow from the upper to the lower fill.

Upper and lower fill sections 20 and 22, respectively, are illustrated in triangular form. This has a number of distinct advantages. Firstly, it maximizes the amount of fill in the gas-liquid contact portion of the cooling tower. In addition, the composite fill assembly 16 has high structural integrity in this configuration because lower fill assembly 22 provides structural support for sloping fill section 18 which bears directly against it and which, in turn, supports upper fill section 20 which bears against fill section 18.

In another embodiment, upper and lower fill sections 20 and 22 may be formed in shapes other than triangular. For example, in an embodiment, not shown, such sections may be of sloped rectangular configuration similar in cross-section to sloping fill section 18. In this instance, it is preferable that the thickness or distance between the major faces of such superimposed layers is such that the high density fill has a thickness from about the same to about twice the thickness of the low density fill.

The thickness of sloping fill 18 is chosen depending upon the requirements of the tower and the density of the fill. In a typical tower, such thickness is from about 2% to 10% of the total length of the sloping fill section or from about 2% to 20% the distance from the upper water distribution to the receiving basin.

A variety of other types of film fill may be employed in accordance with the present invention. However, in each instance, the sheets of each film fill should be spaced in a manner to function as film fill. That is, the sheets preferably should be no further than two inches apart and should be characterized by sheet profiles which will maximize the number of contact points between the upper and lower fill packs to enhance runoff of water by capillary action at these contact points and thereby expedite the spread of a uniform film of water over the lower film surfaces. Such other types of film fill include parallel, spaced corrugated film fill, and parallel sheets spaced by indentation, as illustrated in FIGS. 6 and 7 respectively of U.S. Pat. No. 3,917,764, incorporated herein by reference. In each instance, the film fill should be of a type that spreads liquid gravitating onto the top of the film fill into a thinner, more uniform film at the lower surface thereof to maximize the efficiency of the film type fill. Also, faces of the low density film fill sections should be in direct contact with the adjacent faces of the high density film fill sections.

There are several advantages to sandwiching the sloping high density fill between sections of low density fill. It has been found that the sloping high density film fill shown in U.S. Pat. No. 3,917,764 can be adversely affected by poor water diffusion from splash fill located above the film fill. Such poor diffusion results when a splash bar sags, creating a low point from which concentrated streams run into the film fill, or when there may be a burr or sliver on a splash bar which creates a drainage point from which a concentrated stream of water flows. A properly positioned low density film fill results in water flowing in a generally uniform film when it arrives at the bottom of the film fill sheets, and thus each of the many contact points in the lower fill pack receives generally the same amount of water from the upper low density fill. The same is true of the water received by the low density fill underneath the sloping film fill. The sloping film fill in U.S. Pat. No. 3,917,764 can create a poor water distribution into splash fill positioned below that film fill. This poor distribution is caused by the tendency for water leaving that film fill to run down the lowermost edges of the film fill sheets, thus building up in concentrated streams before running off onto support members, or from burrs on the edges. This does not happen in a horizontally oriented film pack, particularly if that pack is provided with extended edges on alternate sheets such as shown in U.S. Pat. No. 2,809,817. U.S. Pat. No. 4,385,011 illustrates a design wherein strips are built into the lower edges of the sheets in a sloping pack in order to provide drainage points from which water will run off, however this feature is costly, and still results in concentrated streams.

A low density film pack located below a high density film pack tends to accept water by capillarity from the many points of contact with the high density film pack. The low density film pack has fewer sheets from which the water will run off, and the resulting higher water concentration on each sheet tends to help the water run off before it can accumulate and run down the lower edge of the sheets. In the case of the triangular low density film pack, the lower edges are horizontal, as in above U.S. Pat. No. 2,809,817, and the runoff is even more uniform. In each case discussed above, the low density film pack also provides some cooling surface as well as providing enhanced water distribution.

Figure 2:
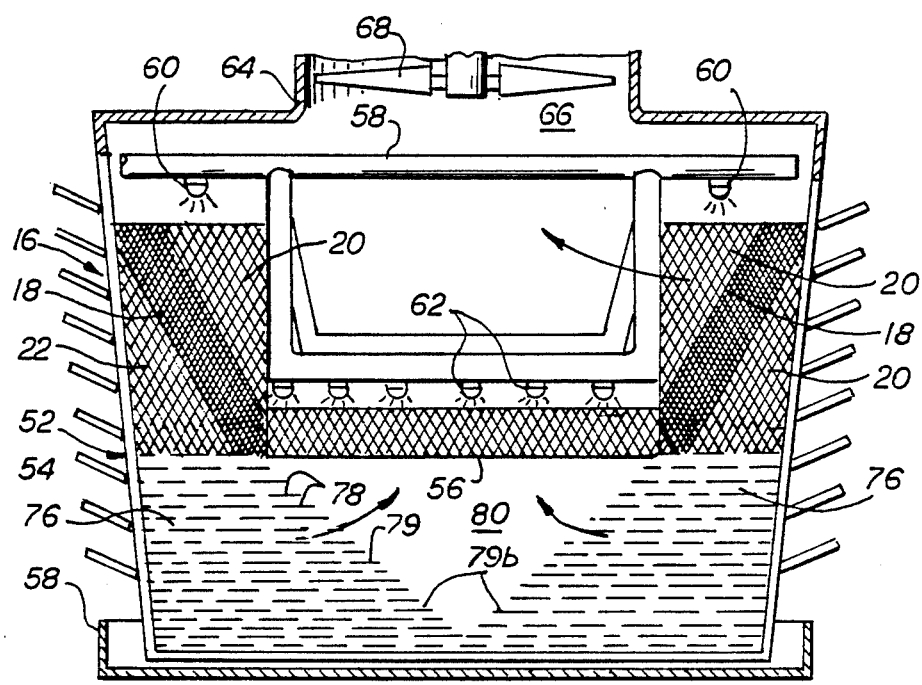

FIG. 2 illustrates another embodiment of the invention in which assembly 16 is disposed in only part of the tower available for gas liquid contact. The tower includes assembly 16 formed of sloping film fill section 18 and upper and lower triangular film fill sections 20 and 22, respectively, of the same type set forth above. In this instance, assembly 16 is mounted in the upper outboard area of the cooling tower adjacent to the upper portion of air inlet opening 52 framed by louvered tower side wall 54.

Extending between the film fill assemblies 16 in the upward area of the tower is a horizontal film fill section 56 which includes the film fill such as the corrugated film fill or alternatives as set out above. Film fill section 56 suitably extends so that its bottom face is generally at the same elevation as the bottom face of film fill assembly 16.

A cooled liquid basin 58 is disposed below the film fill assembly 16 and fill section 56 in a position to receive gravitating liquid therefrom. Liquid is supplied to the top of assembly 16 and fill section 56 from water inlet pipe 58 which directs the water through spaced nozzles 60 and 62 which provide a uniform distribution of the liquid over assembly 16 and fill section 56, respectively. A vertical stack 64 is secured in the top of the tower and extends upwardly to define an air outlet opening 66. A fan 68 is positioned within the stack and is coupled to a suitable source of power.

Below film fill assembly 16 is splash fill assembly 76 which partially fills the plenum below film fill assembly 16. Splash fill assembly 76 may be formed of a conventional type including a plurality of elongated splash bars 78. The bars are suspended by conventional hangers, not shown, oriented such that the longitudinal axes of the bars are in general alignment with the flow of air currents through the fill assembly. This provides splash surfaces for water gravitating from the bottom of film fill assembly 16 to thereby spread the water out for more efficient cooling with incoming air. Splash fill assembly 76 extends in the air inlet plenum below film fill assembly 16 and intersects the path between the gas inlet opening 52 and the bottom surface of film fill assembly 16.

As illustrated, splash fill assembly 76 includes an inner side 79 at least partially defining a central plenum chamber 80. Inner side 79 slopes from its top 79a which is adjacent to the lower inboard corner 16a of film fill assembly 16 and generally downwardly in an inward direction to terminate in the lowest and most inward portion 79b at an upper side just above collection basin 58. As used herein, the term "inner side" of the splash fill generally means the innermost extent of splash fill assembly 76 adjacent to the generally open central plenum 80. It is to be understood that there may be variations of side 79 from a straight line so long as in composite it slopes in an inward direction. The slope of side 79 should be the substantial angle to both the horizontal and vertical. The preferred slope is about 45° from the vertical while other slopes may be used, say, about 30°–60° from the vertical. The advantages of using this type of splash fill in the lower portion of a column including film fill in the upper portion of the tower is illustrated in U.S. Pat. No. 4,592,877, incorporated herein by reference.

The advantages of this configuration are as follows: The problems with runoff noted above are particularly important in this design since a large percentage of the splash fill 76 in the tower is located below the upper section 16, and water conveyed inward by sloping film section 18 would tend to adversely affect water distribution into this portion of fill 76. By incorporating low density film fill 22 into this design, this potential water distribution problem is essentially eliminated.

Figure 3:
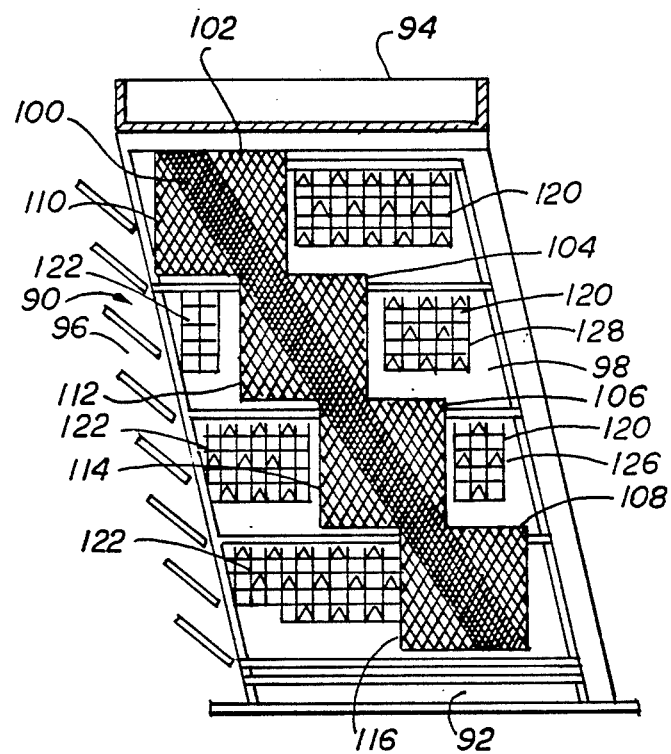

Referring to FIG. 3, another embodiment of the invention is illustrated using the principle of a sloping sandwich of low density-high density-low density fill together with certain of the advantages of stacking as illustrated in U.S. Pat. No. 4,317,785, incorporated herein by reference. In this embodiment, the upper and lower low density film fill sections may be of generally triangular shape similar to that of FIG. 4. In a preferred embodiment, the sloped film fill extends from a point just below the water distribution pan at the outboard side of the tower to a point just above the water collection pan at the inboard side of the tower in a continuous layer. This layer of high density film fill avoids short circuiting of the air through contact points at the corners of the low density fill sections where resistance to air flow would be minimal were it not for the layer of high density sloping film fill located there.

Referring specifically to FIG. 3, only the gas-liquid contact portion of the tower is illustrated, generally designated by the number 90. It includes a lower cooled liquid collection basin 92 and an upper perforated distribution pan 94 suitably connected to a source of water to be cooled. Tower 90 includes a gas inlet opening 96 and gas outlet opening 98 framed by respective outboard and inboard walls of the tower.

Sloping film fill assembly 100 is mounted by conventional means to extend from a point just below distribution pan 94 at its outboard end to just above water collection pan 92 at its inboard end. Sloping film fill section 100 is of the same general type as section 18 described above.

The tower is provided with conventional louvers at its outboard side and drift eliminators at its inboard side.

In the illustrated embodiment, there are four upper film fill sections 102–108 of generally triangular cross-sectional configuration. In this instance, the triangles are right angled with the hypotenuse of each triangle meeting with the adjacent upper face portion of film fill section 100. In composite, the upper film fill sections form a stair-shaped configuration. Correspondingly, the lower film fill sections 110–116 are illustrated as right angle triangular sections with the hypotenuse of each triangle meeting with the adjacent lower face of sloping fill section 100. In composite, the four lower film fill sections form an inverted stair-shaped configuration. The upper and lower triangular film fills are in contact with and possibly adhered to the sloping film fill.

Each pair of opposed triangular sections together with the interposed portion of the sloping film fill section 100 form in composite a film fill assembly of parallelogram configuration similar in configuration to that illustrated in FIG. 4. Thus, one could view the tower as including four superposed assemblies of the type illustrated in that Figure.

There are significant operational and structural advantages in the illustrated configuration. The lower film fill sections can be readily supported on horizontal framing members of the tower structure and the like providing adequate support for the sloping film fill and upper low density film fill. This upper low density film fill provides an air path of pressure drop equal to that passing through the lower low density film fill. The tower also includes splash fill section 120 and 122 inboard and outboard of the film fill sections, respectively. As illustrated, such sections include elongated inverted V-shaped splash bars 126 along matrices of hangers 128 oriented transverse the flow of air through a film fill assembly. This configuration provides a fill section whereby the major portion of the air pressure drop takes place through the film fill sections. The splash fill sections 120 and 122 provide some degree of cooling, but at low air pressure drop, thereby not overloading the fan. This configuration is desirable for large crossflow towers where otherwise filling the entire section 90 with film fill would place a heavy load on the fan.

What is claimed:

1. A tower for contacting liquid and gas comprising at least one upright sidewall having a gas inlet opening, means for supplying gravitating liquid through the upper portion of the tower, a gas outlet opening, a high density sloping film fill section having a principal plane inclined at an angle between about 20° and 70° to the vertical, low density upper and lower film fill sections disposed on opposite sides of and in contact with said sloping film fill section, said sloping film fill section and upper and lower film fill sections being disposed below said liquid supply means and comprising a plurality of sheets mounted so that the sheets in composite form said sections in integral units with adjacent sheets contacting each other and defining passages for gas and liquid, the sheets in said sloping film fill section and upper and lower film fill sections being substantially aligned to define a gas path extending generally from said gas inlet opening to said gas outlet opening and being substantially vertically disposed to provide an essentially vertical path to liquid gravitating from said liquid supply means, the sheets of said sloping film fill section being substantially more densely packed than the sheets of both said upper and lower film fill sections.

2. The tower of claim 1 in which said sloping film fill section bears against and is supported by said lower film fill section.

3. The tower of claim 1 in which said upper film fill section bears against and is supported by said sloping film fill section.

4. The tower of claim 1 in which the lower side of said sloping film fill defines a first face, and the upper side of said lower film fill define a second face, said tower further comprising adhesive means binding contact points between said first and second faces.

5. The tower of claim 1 in which the upper side of the sloping film fill means defines a third face and the lower side of said upper film fill means defines a fourth face, said tower further comprising adhesive means binding contact points between said first and second faces.

6. The tower of claim 1 in which said upper film fill section is of generally triangular shaped configuration.

7. The tower of claim 1 in which said lower film fill section is of generally triangular configuration.

8. The tower of claim 1 in which the sheets of said sloping film fill section are corrugated with the corrugations in alternate sheets crossing the corrugations in the sheets between the alternative sheets.

9. The tower of claim 8 in which the sheets of said upper film fill section are corrugated with the corrugations in alternate sheets crossing the corrugations in the sheets between the alternative sheets.

10. The tower of claim 8 in which the sheets of said lower film fill section are corrugated with the corrugations in alternate sheets crossing the corrugations in the sheets between the alternative sheets.

11. The tower of claim 1 in which said upper and lower film fill section are of generally triangular shape, said tower further comprising multiple adjacent ones of said upper and lower film fill sections extending, respectively, above and below said sloping film fill section in stair-step configuration.

12. The tower of claim further comprising a horizontal film fill section with its one end adjacent to the inboard end of said sloping film fill section and disposed below said gas outlet opening.

13. An integral film fill assembly suitable for use in a cooling tower, said assembly comprising a sloping high density film fill section extending between opposite corners of said unit, and low density upper and lower film fill sections disposed on opposite sides of and adjacent to said sloping film fill section and being adhered thereto, said sloping and upper and lower film fill sections each comprising a plurality of sheets mounted with adjacent sheets being bound to each other but sufficiently spaced apart for the passage of liquid, said sheets in said sloped and upper and lower film fill sections being substantially aligned, the sheets of said sloping film fill section being substantially more densely packed than the sheets of both said upper and lower film fill sections.

14. The film fill unit of claim 13 in which said upper and lower film fill sections are of generally triangular shape.

15. The film fill unit of claim 13 in which the sheets of said sloping film fill section are corrugated with the corrugations in alternate sheets crossing the corrugations in the sheets between the alternative sheets.

16. The film fill unit of claim 13 in which the sheets of said upper film fill section are corrugated with the corrugations in alternate sheets crossing the corrugations in the sheets between the alternative sheets.

17. The film fill unit of claim 13 in which the sheets of said lower film fill section are corrugated with the corrugations in alternate sheets crossing the corrugations in the sheets between the alternative sheets.

18. The film fill unit of claim 13 in the general configuration of a parallelogram.

* * * * *

UNITED STATES PATENT AND TRADEMARK OFFICE
CERTIFICATE OF CORRECTION

PATENT NO. : 4,934,663

DATED : June 19, 1990

INVENTOR(S) : Peter M. Phelps

It is certified that error appears in the above-identified patent and that said Letters Patent is hereby corrected as shown below:

Claim 12, column 10, line 33, after the word "claim", insert --1--.

Signed and Sealed this

Seventeenth Day of December, 1991

Attest:

HARRY F. MANBECK, JR.

*Attesting Officer*      *Commissioner of Patents and Trademarks*